United States Patent
Lee

(10) Patent No.: US 8,531,528 B2
(45) Date of Patent: Sep. 10, 2013

(54) IMAGE SENSOR CAPABLE OF REALIZING NIGHT-PHOTOGRAPHING AND FUNCTIONS OF PROXIMITY SENSOR AND ILLUMINANCE SENSOR

(75) Inventor: Byoung Su Lee, Yeosu-si (KR)

(73) Assignee: Siliconfile Technologies Inc., Seoul (KR)

(*) Notice: Subject to any disclaimer, the term of this patent is extended or adjusted under 35 U.S.C. 154(b) by 326 days.

(21) Appl. No.: 13/063,994

(22) PCT Filed: Oct. 29, 2009

(86) PCT No.: PCT/KR2009/006274
§ 371 (c)(1),
(2), (4) Date: Mar. 15, 2011

(87) PCT Pub. No.: WO2010/050751
PCT Pub. Date: May 6, 2010

(65) Prior Publication Data
US 2011/0193968 A1    Aug. 11, 2011

(30) Foreign Application Priority Data
Oct. 30, 2008 (KR) .................. 10-2008-0106940

(51) Int. Cl.
*H04N 5/33* (2006.01)
(52) U.S. Cl.
USPC .......................................... 348/164

(58) Field of Classification Search
USPC .......................................... 348/164
See application file for complete search history.

(56) References Cited

U.S. PATENT DOCUMENTS

2005/0088567 A1* 4/2005 Kim .................. 348/370
2006/0110145 A1   5/2006 Fujimoto et al.

FOREIGN PATENT DOCUMENTS

| CN | 2777879 Y | 5/2006 |
| CN | 101296326 A | 10/2008 |
| JP | 2000-338389 A | 12/2000 |
| JP | 2005-215322 A | 8/2005 |

OTHER PUBLICATIONS

International Search Report, Appln No. PCT/KR2009/006274, dated Jul. 8, 2010.
Written Opinion of the International Searching Authority, Appln No. PCT/KR2009/006274, dated Jul. 8, 2010.

* cited by examiner

*Primary Examiner* — Christopher S Kelley
*Assistant Examiner* — Zhen Jessica Li
(74) *Attorney, Agent, or Firm* — Kile Park Reed & Houtteman PLLC

(57) ABSTRACT

An image sensor capable of realizing night-photographing and functions of a proximity sensor and an illuminance sensor. The image sensor includes a light source for emitting light toward a subject; a light source control section for controlling current applied to the light source; an illuminance sensor section for sensing an illuminance of surrounding environment; and a sensor section having an image sensor unit for sensing an image signal.

6 Claims, 3 Drawing Sheets

IMAGE SENSOR CAPABLE OF REALIZING NIGHT-PHOTOGRAPHING AND FUNCTIONS OF PROXIMITY SENSOR AND ILLUMINANCE SENSOR

BACKGROUND OF THE INVENTION

1. Field of the Invention

The present invention relates to an image sensor, and more particularly, to an image sensor which includes a light emitting diode (LED) having a wavelength of 650 nm or a wavelength band of 610 nm to 650 nm and an illuminance sensor section having illuminance sensors and red pixels such that an illuminance can be measured and photographing can be easily implemented without loss of image quality in a night-photographing mode or a proximity measurement mode.

2. Description of the Related Art

In order to overcome the disadvantages of a general CCD (charge-coupled device) camera, an infrared (IR) CCD camera capable of photographing a subject even at night using an IR illumination device has been disclosed in the art. Recently, the IR CCD camera is gaining popularity as a surveillance camera because it can photograph an image up to an IR wavelength band which is invisible to human eyes so that photographing a subject is possible not only in the daytime but also at night.

An image sensor employing a CCD or a CMOS (complementary metal oxide semiconductor) has an absorption band of 400 nm to 1,100 nm. In general, visible rays have a wavelength band of 380 nm to 650 nm, and infrared rays have a wavelength band of about 650 nm to 1,100 nm. In order to display colors, an IR cutoff filter (which passes light rays having a wavelength band below 650 nm and cuts off light rays having a wavelength band over 650 nm) is used so as to sense the same colors that are perceived by a person. In the image sensor, in order to photograph a subject at night with weak external light, the following two methods are generally used.

In a first method, the IR cutoff filter is mechanically removed at night, and an LED having an IR wavelength band (mainly of 850 nm) is turned on. In a second method, the properties of the IR cutoff filter are set to pass only a specified IR wavelength band (mainly of 850 nm), and an LED having a certain wavelength band (mainly of 850 nm) is externally used as an illumination source.

However, in the first method, since a device for mechanically moving the IR cutoff filter is needed, a problem is caused in that the manufacturing cost increases. In the second method, even though the device for mechanically moving the IR cutoff filter is not needed, as the light rays of 850 nm pass through the IR cutoff filter in the daytime, a problem is caused in that the qualities of colors are likely to be degraded.

Meanwhile, a proximity measurement function is used in such a way as to measure how far a human body, etc. is away from an image sensor (or a mobile terminal), and to intercept power supply to a back light unit (BLU) of an LCD (liquid crystal display) when the human body is close to the image sensor (for example, while talking over the mobile terminal) so as to reduce power consumption or to interrupt the operation of a touch sensor so as to prevent mis-operation thereof. Recently, the proximity measurement function is increasingly demanded in the art.

In the conventional art, the proximity measurement function is achieved by an LED and a light receiving element. In general, a proximity sensor is separately manufactured and is mounted to the mobile terminal, and so forth.

An illuminance measurement function is realized as a device for measuring the brightness of external light in a mobile terminal. In the case where the brightness of external light is substantial, the brightness of a display unit of the mobile terminal is elevated so that the readability of displayed information can be improved, and in the case where the brightness of external light is insufficient, the brightness of the display unit of the mobile terminal is lowered so that glaringness is prevented and power consumption can be reduced. In general, in order to provide the illuminance measurement function, an illuminance sensor is mounted separately from the image sensor.

SUMMARY OF THE INVENTION

Accordingly, the present invention has been made in an effort to solve the problems occurring in the related art, and an object of the present invention is to provide an image sensor which can realize night-photographing and functions of a proximity sensor and an illuminance sensor without mounting a separate illuminance sensor.

In order to achieve the above object, according to an aspect of the present invention, there is provided an image sensor capable of realizing night-photographing and functions of a proximity sensor and an illuminance sensor, comprising a light source for emitting light toward a subject; a light source control section for controlling current applied to the light source; an illuminance sensor section for sensing an illuminance of surrounding environment from light reflected from the subject and having passed through a lens; and a sensor section having an image sensor unit for sensing an image signal from the light reflected from the subject.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENT

Figure 1:
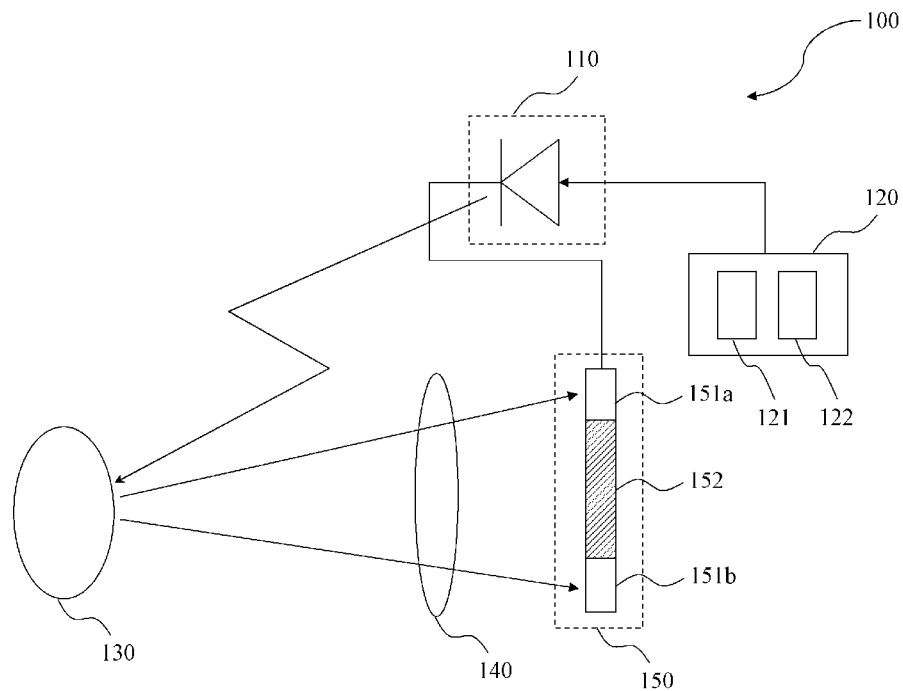
FIG. 1 is a systematic view illustrating an image sensor capable of realizing night-photographing and functions of a proximity sensor and an illuminance sensor in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a systematic view illustrating an image sensor capable of realizing night-photographing and functions of a proximity sensor and an illuminance sensor in accordance with an embodiment of the present invention.

Referring to FIG. 1, an image sensor system 100 capable of realizing night-photographing and functions of a proximity sensor and an illuminance sensor in accordance with an embodiment of the present invention includes a light source 110, a light source control section 120, a subject 130, a lens 140, and a sensor section 150.

The light source 110 employs an LED (light emitting diode) which has a wavelength of 650 nm, and emits light rays toward the subject 130. The reason why the wavelength of 650 nm is used resides in that, in the case where the LED for illumination at night or measurement of a distance is turned on, while minimum brightness should be provided so that a person does not feel glaring and cannot substantially perceive the flickering of the LED and the sensitivity of a sensor for sensing the light reflected from the subject 130 should be high enough, the wavelength of 650 nm can ideally satisfy these requirements. Although it is preferable to use the wavelength of 650 nm, if the wavelength is difficult to be obtained, a red wavelength band of 610 nm to 660 nm can of course be used. Also, a blue wavelength band of 350 nm to 450 nm can be used as well.

Figure 2:
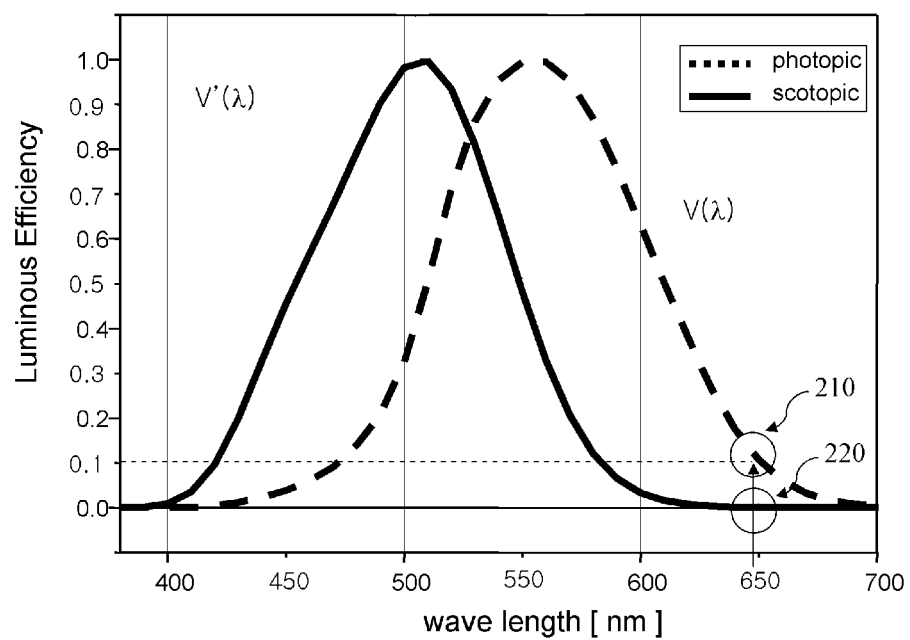
FIG. 2 is a graph showing response curves of luminance perceived by a person in a scotopic state and a photopic state under the wavelength of 650 nm.

FIG. 2 is a graph showing response curves of luminance perceived by a person in a scotopic state and a photopic state under the wavelength of 650 nm.

Referring to FIG. 2, at the wavelength of 650 nm, a luminous stimulus 210 of a photopic state is 0.1 (10%), and a luminous stimulus 220 of a scotopic state is 0 (0%). The luminous stimulus is represented by the intensity of brightness stimulus which a person perceives by light rays physically having the same output. For example, in the photopic state in which it is possible to distinguish colors, when assuming that the bright stimulus which a person perceives by light having a wavelength of 550 nm having an output of 1 W is 1, it is meant that the light having the wavelength of 650 nm having an output of 1 W is perceived as having brightness of 0.1. Also, in the scotopic state (a darkroom or dark circumstances) in which it is impossible to distinguish colors, it is meant that the light having the wavelength of 650 nm is perceived by a person as having no substantial brightness. Accordingly, since a person cannot perceive no substantial brightness from illumination of 650 nm wavelength in the scotopic state, glaringness can be prevented, and therefore, it can be understood that the illumination of 650 nm wavelength is ideal to be used for illumination in a night-photographing mode.

Figure 3:
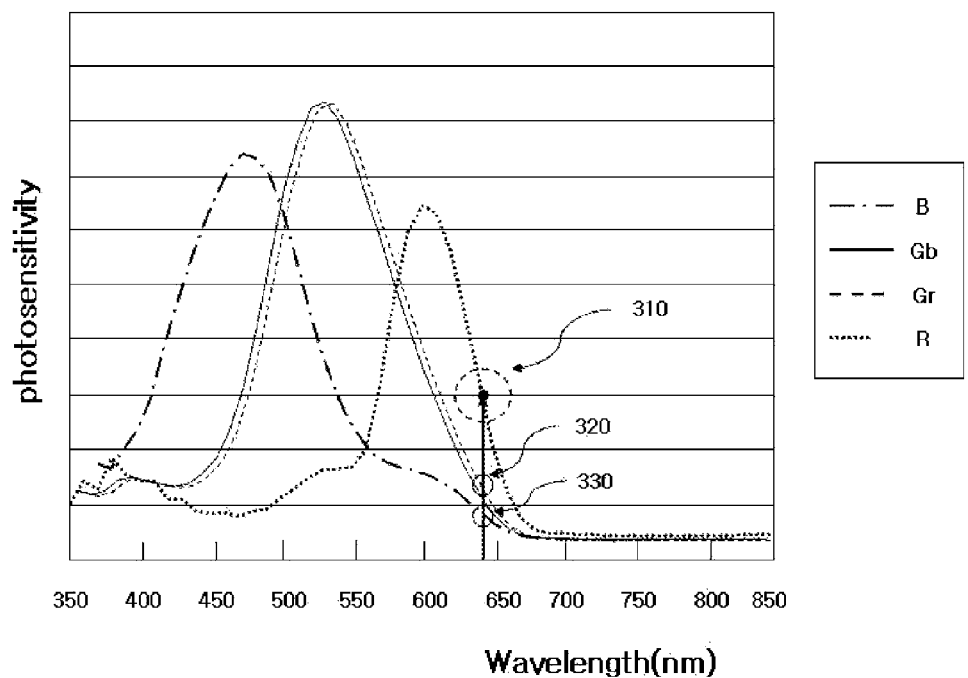
FIG. 3 is a graph showing the relative sensitivities of RGB pixels in the case where an IR color filter is mounted according to the present invention.

Referring to FIG. 1, the light source control section 120 includes an LED controller 121 and an LED driver 122. The night-photographing mode adopts a scheme in which current is applied to the LED to emit light rays and an image is obtained from the light rays reflected from the subject 130 using an image sensor unit 152 of the sensor section 150. The night-photographing mode can be selected when brightness with the LED turned off is lower than a reference value. Therefore, when it is determined that the brightness of an image is very low during the operation of the image sensor, that is, it is the nighttime, the LED controller 121 turns on the LED, and the LED driver 122 supplies current to the LED. As described above, it is preferred that the LED use light having the wavelength of 650 nm. When considering sensitivity curves of the image sensor in relation to wavelengths (see FIG. 3), it can be observed that the sensitivity 310 of a red pixel at the wavelength of 650 nm corresponds to about 50% compared to the sensitivity thereof at the wavelength of 600 nm as the peak sensitivity wavelength of the red pixel. That is to say, it is preferred that illumination in the night-photographing mode use the LED having the wavelength of 650 nm so as to meet the requirement that the sensitivity of the image sensor should be sufficiently high.

Figure 4:
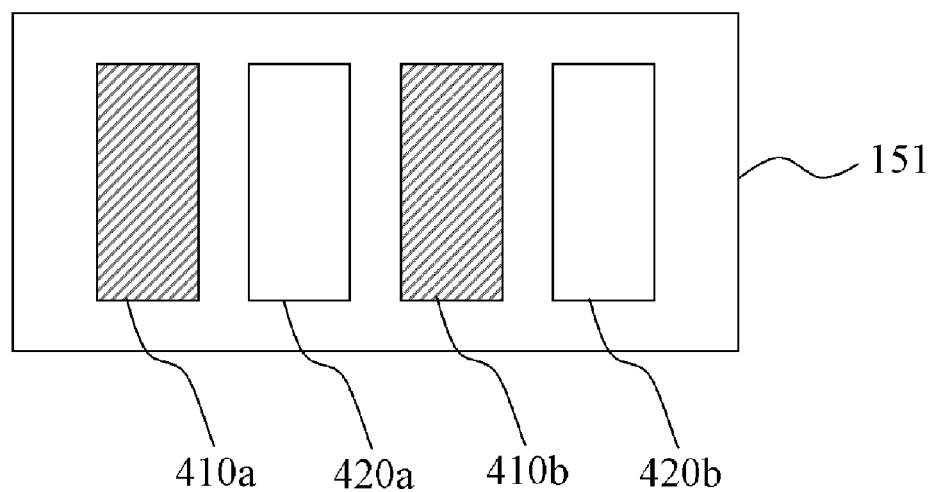
FIG. 4 is a view illustrating a state in which illuminance sensors and red pixels are alternately arranged with each other.

FIG. 4 is a view illustrating a state in which illuminance sensors and red pixels are alternately arranged with each other.

Referring to FIGS. 1 and 4, the sensor section 150 includes an illuminance sensor unit 151 which has a first illuminance sensor 151a and a second illuminance sensor 151b, and the image sensor unit 152. The first illuminance sensor 151a and the second illuminance sensor 151b are respectively arranged adjacent to both ends of the image sensor unit 152. The illuminance sensor unit 151 has illuminance sensors 410a and 410b and red pixels 420a and 420b. As can be readily seen from FIG. 4, the illuminance sensors 410a and 410b and the red pixels 420a and 420b are alternately arranged with each other. Further, it is preferred that a plurality of illuminance sensors and a plurality of red pixels be arranged adjacent to both ends of the image sensor unit 152.

The present invention is not limited to the adoption of red pixels for a light emitting wavelength band of 610 nm to 660 nm, and instead, it is to be noted that blue pixels can be adopted for a light emitting wavelength band of 350 nm to 450 nm as the occasion demands.

The illuminance sensors 410a and 410b serve as sensors for measuring the intensity of light incident thereon as external light is reflected by the subject 130 and passes through the lens 140. In general, the spectrum of an illuminance sensor is designed to have the same spectrum as the curve of brightness which is perceived by a person. Also, since a plurality of illuminance sensors are arranged adjacent to both ends of the image sensor section 152, it is possible to obtain the average of light reflected from the subject, and through this, a current illuminance by the external light can be measured.

The red pixels 420a and 420b or the blue pixels (not shown), which are arranged along with the illuminance sensors 410a and 410b, are combined with the light emitting diode 110 to be used as a proximity sensor.

Figure 5:
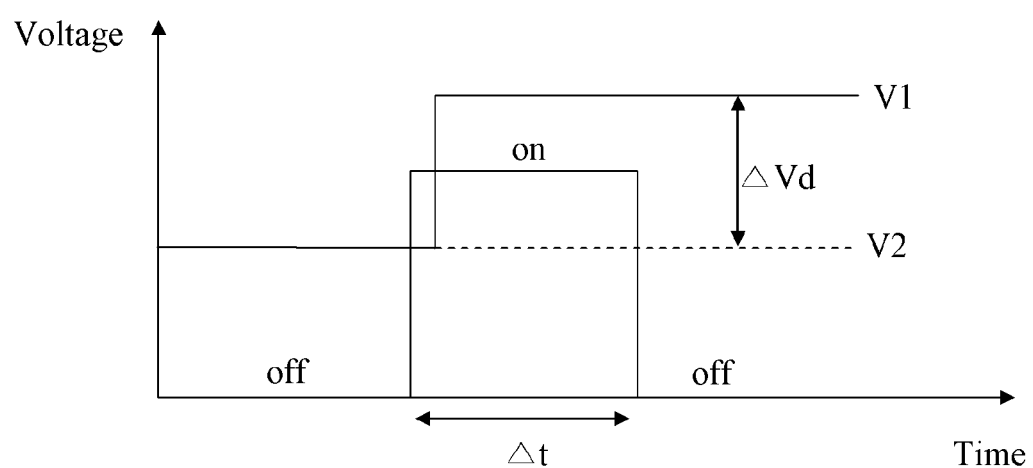
FIG. 5 is a graph for explaining a method for calculating a proximity to a subject using the output voltage of a red pixel according to the present invention.

FIG. 5 is a graph for explaining a method for calculating a proximity to a subject using the output voltage of a red pixel according to the present invention.

Referring to FIG. 5, V1 represents an output voltage value of a red pixel in the case where an LED, which is used as an illumination source in a night-photographing mode and has the wavelength of 650 nm, is turned on, V2 represents an output voltage value of the red pixel in the case where the LED, which has the wavelength of 650 nm, is turned off, and ΔVd represents the different between V1 and V2.

Referring to FIG. 1, when the LED is turned off, the intensity of the light which is reflected from the subject and is incident on the red pixel is determined by the intensity of external light. When the LED is turned on, the intensity of the light which is reflected from the subject and is incident on the red pixel is determined by the intensity of external light and the intensity of the light emitted from the LED. Thus, the difference between the voltage value of the red pixel with the LED turned off and the voltage value of the red pixel with the LED turned on is determined by the light emitted from the LED and the subject irrespective of the external light. The value of ΔVd depends on the distance between the subject and the LED. If the subject is placed far away from the LED, there is no substantial amount of light which is emitted from the LED, is reflected from the subject and is incident on the red pixel. In comparison with this, as the subject gradually approaches, an amount of light, which is emitted from the LED, is reflected from the subject and is incident on the red pixel, increases. Hence, the value of ΔVd increases. That is to say, the value of ΔVd is proportional to reflectance (R) and is inversely proportional to the square of the distance (d) between the red pixel and the subject. Therefore, in the case where the distance (d) is very great (a great distance), there is no difference in the voltage value of the red pixel between when the LED is turned on and when the LED is turned off. However, if the distance (d) is small (a short distance), by obtaining the difference in the voltage value of the red pixel, that is, ΔVd, the distance (d) between the red pixel and the subject can be precisely calculated.

The present invention is not limited to the adoption of red pixels for a light emitting wavelength band of 610 nm to 660 nm, and instead, it is to be noted that blue pixels can be adopted for a light emitting wavelength band of 350 nm to 450 nm as the occasion demands.

In actual realization, in order to precisely calculate the distance (d) between the subject and the red pixel, it is preferred that the turn-on time interval of the LED be set to 0.1 sec and measurement be repeated three to five times.

As is apparent from the above description, in the present invention, night-photographing is made possible without using an IR cutoff filter for passing a specified IR band or without the need of a mechanical device for moving an IR filter, and the functions of an illuminance sensor and a proximity sensor can be realized using an image sensor while obviating the need for mounting a separate illuminance sensor. As a consequence, in the present invention, technical advantages can be attained in that it is possible to provide, at a reasonable cost, an image sensor capable of realizing night-photographing and functions of a proximity sensor and an illuminance sensor.

Although a preferred embodiment of the present invention has been described for illustrative purposes, those skilled in the art will appreciate that various modifications, additions and substitutions are possible, without departing from the scope and the spirit of the invention as disclosed in the accompanying claims.

The invention claimed is:

1. An image sensor capable of realizing night-photographing and functions of a proximity sensor and an illuminance sensor, comprising:
a light source for emitting light toward a subject;
a light source control section for controlling current applied to the light source;
an illuminance sensor section for sensing an illuminance of surrounding environment;
and a sensor section having an image sensor unit for sensing an image signal
wherein the illuminance sensor section comprises illuminance sensors and red pixels which are arranged adjacent to both ends of the image sensor unit,
wherein the illuminance sensor section comprises illuminance sensors and blue pixels which are arranged adjacent to both ends of the image sensor unit,
wherein the red pixels are used to calculate a distance between the red pixels and the subject using a difference between voltage values respectively outputted when the light source is turned on and off, and
wherein the blue pixels are used to calculate a distance between the blue pixels and the subject using a difference between voltage values respectively outputted when the light source is turned on and off.

2. The image sensor according to claim 1, wherein the light source comprises a light emitting diode (LED) which has a wavelength band of 610 nm to 660 nm.

3. The image sensor according to claim 1, wherein the light source comprises a light emitting diode (LED) which has a wavelength band of 350 nm to 450 nm.

4. The image sensor according to claim 1, wherein the illuminance sensor section comprises illuminance sensors which are arranged adjacent to both ends of the image sensor unit.

5. The image sensor according to claim 1, wherein the light source control section comprises an LED controller and an LED driver.

6. The image sensor according to claim 5, wherein the LED controller and the LED driver turn on the LED when it is determined that an illuminance is low as a result of comparison between brightness of light reflected from the subject and average brightness of the image sensor unit, and supply current to the LED.

* * * * *